(12) United States Patent
Chen

(10) Patent No.: US 10,694,826 B2
(45) Date of Patent: Jun. 30, 2020

(54) HAIR COMB

(71) Applicant: Cheng Lang Chen, Taichung (TW)

(72) Inventor: Cheng Lang Chen, Taichung (TW)

( * ) Notice: Subject to any disclaimer, the term of this patent is extended or adjusted under 35 U.S.C. 154(b) by 196 days.

(21) Appl. No.: 16/035,715

(22) Filed: Jul. 16, 2018

(65) Prior Publication Data
US 2020/0015565 A1 Jan. 16, 2020

(51) Int. Cl.
*A45D 24/02* (2006.01)

(52) U.S. Cl.
CPC .................................. *A45D 24/02* (2013.01)

(58) Field of Classification Search
CPC ........ A45D 24/02; A45D 24/04; A45D 24/30; A45D 24/42
USPC ................. 132/128, 152, 154, 156
See application file for complete search history.

(56) References Cited

U.S. PATENT DOCUMENTS

| | | | | | |
|---|---|---|---|---|---|
| 2,110,323 | A | * | 3/1938 | Carns | A45D 24/24 132/115 |
| 2,221,446 | A | * | 11/1940 | Evans | A45D 24/04 132/154 |
| 3,855,689 | A | * | 12/1974 | Schiffman | B23P 15/00 29/433 |
| 4,187,866 | A | * | 2/1980 | Zwiren | A45D 24/04 132/151 |
| 6,279,582 | B1 | * | 8/2001 | Wang | A46B 7/06 119/632 |
| 6,874,446 | B2 | * | 4/2005 | Plante | A01K 13/002 119/612 |
| 2008/0110471 | A1 | * | 5/2008 | Oliver | A45D 24/02 132/148 |

FOREIGN PATENT DOCUMENTS

| CN | 2496299 Y | * | 6/2002 |
|---|---|---|---|
| CN | 103735024 | * | 4/2014 |

OTHER PUBLICATIONS

Machine translation of CN-2496299-Y (Year: 2002).*
Machine translation of CN-103735024 (Year: 2014).*

* cited by examiner

*Primary Examiner* — Michael McCullough

(57) ABSTRACT

A hair comb contains: a hollow handle and a combing assembly. The hollow handle includes a top fringe, a bottom fringe, two protective extensions, an accommodation chamber, a locking groove, and a fixing orifice, wherein a width of the locking groove gradually reduces from the top fringe to the bottom fringe, and the locking groove has two tilted engagement faces. The combing assembly includes a holder, multiple teeth, multiple springs, and a cap. The holder has a trench, two positioning faces, a protrusion, multiple first apertures, and multiple second apertures. The cap has multiple columns, wherein each of the multiple first apertures is more than and is in communication with each of the multiple second apertures, and each first aperture accommodates each of the multiple teeth and the multiple springs. Each of the multiple teeth has an operation portion, a head, and a ball.

5 Claims, 8 Drawing Sheets

HAIR COMB

FIELD OF THE INVENTION

The present invention relates to a hair comb which contains multiple teeth matingly contact with hairs of user or pet.

BACKGROUND OF THE INVENTION

A conventional hair comb contains an elastic structure which includes an arcuate elasticity sheet and a flexible limitation sheet, wherein the arcuate elasticity sheet and the flexible limitation sheet are accommodated in a fixing groove of a seat of the hair comb, and multiple teeth straightly arranged between the arcuate elasticity sheet and the flexible limitation sheet, wherein the multiple teeth extend out of the seat via multiple first orifices of the flexible limitation sheet and multiple second orifices of the seat respectively, and the arcuate elasticity sheet urges the multiple teeth to retract inward.

The multiple teeth are connected via the flexible limitation sheet, so they comb hairs of user or pet simultaneously after being pressed. However, the multiple teeth cannot matingly contact with the hairs.

The present invention has arisen to mitigate and/or obviate the afore-described disadvantages.

SUMMARY OF THE INVENTION

The primary aspect of the present invention is to provide a hair comb which contains multiple teeth matingly contact with hairs of user or pet.

To obtain the above-mentioned aspect, a hair comb provided by the present invention contains: a hollow handle and a combing assembly.

The hollow handle is configured to accommodate a combing assembly, and the hollow handle includes a top fringe formed on a top of the hollow handle, a bottom fringe formed on a bottom of the hollow handle, two protective extensions respectively extending from two peripheral sides of the hollow handle, an accommodation chamber defined between the two protective extensions, a locking groove passing through the top fringe and the bottom fringe, and a fixing orifice passing through central portions of the two peripheral surfaces of the hollow handle, wherein a width of the locking groove gradually reduces from the top fringe to the bottom fringe, and the locking groove has two tilted engagement faces defined on two opposite walls thereof individually.

The combing assembly includes a holder, multiple teeth, multiple springs, and a cap.

The holder has a trench defined on a top thereof and accommodating the cap, and the cap has multiple columns extending from a bottom thereof. The holder has two positioning faces individually arranged on two outer surfaces thereof, a protrusion formed on a middle section of the holder, multiple first apertures defined on the trench, and multiple second apertures individually formed on bottoms of the multiple first apertures, wherein each of the multiple first apertures is more than and is in communication with each of the multiple second apertures, each first aperture accommodates each of the multiple teeth and the multiple springs, each of the multiple teeth has an operation portion, a head arranged on a top of each tooth and a diameter of the head being more than the operation portion, and a ball formed on a distal end of the operation portion.

DETAILED DESCRIPTION OF THE FIRST EMBODIMENTS

Figure 1:
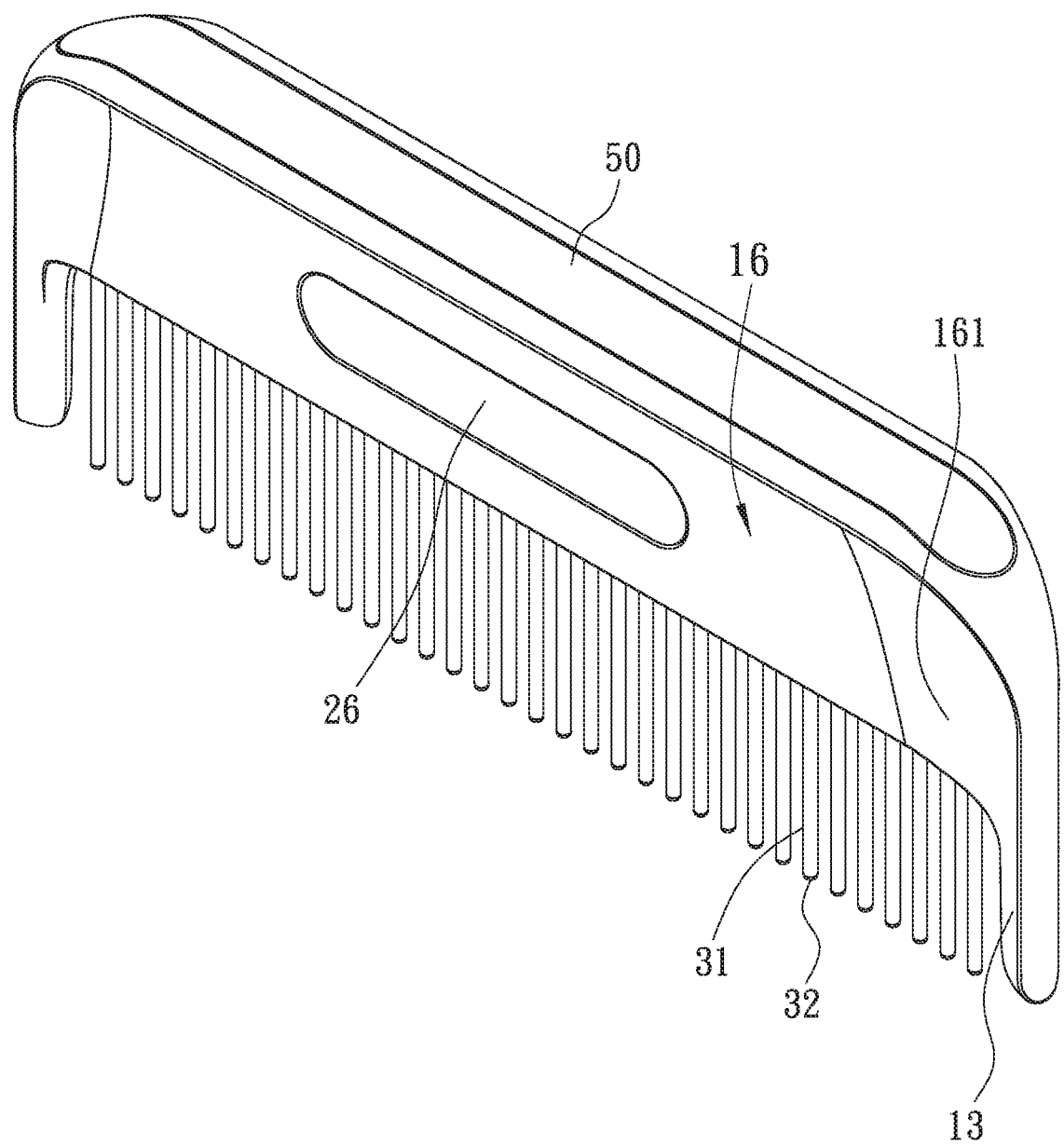
FIG. 1 is a perspective view showing the assembly of a hair comb according to a first embodiment of the present invention.
Figure 2:
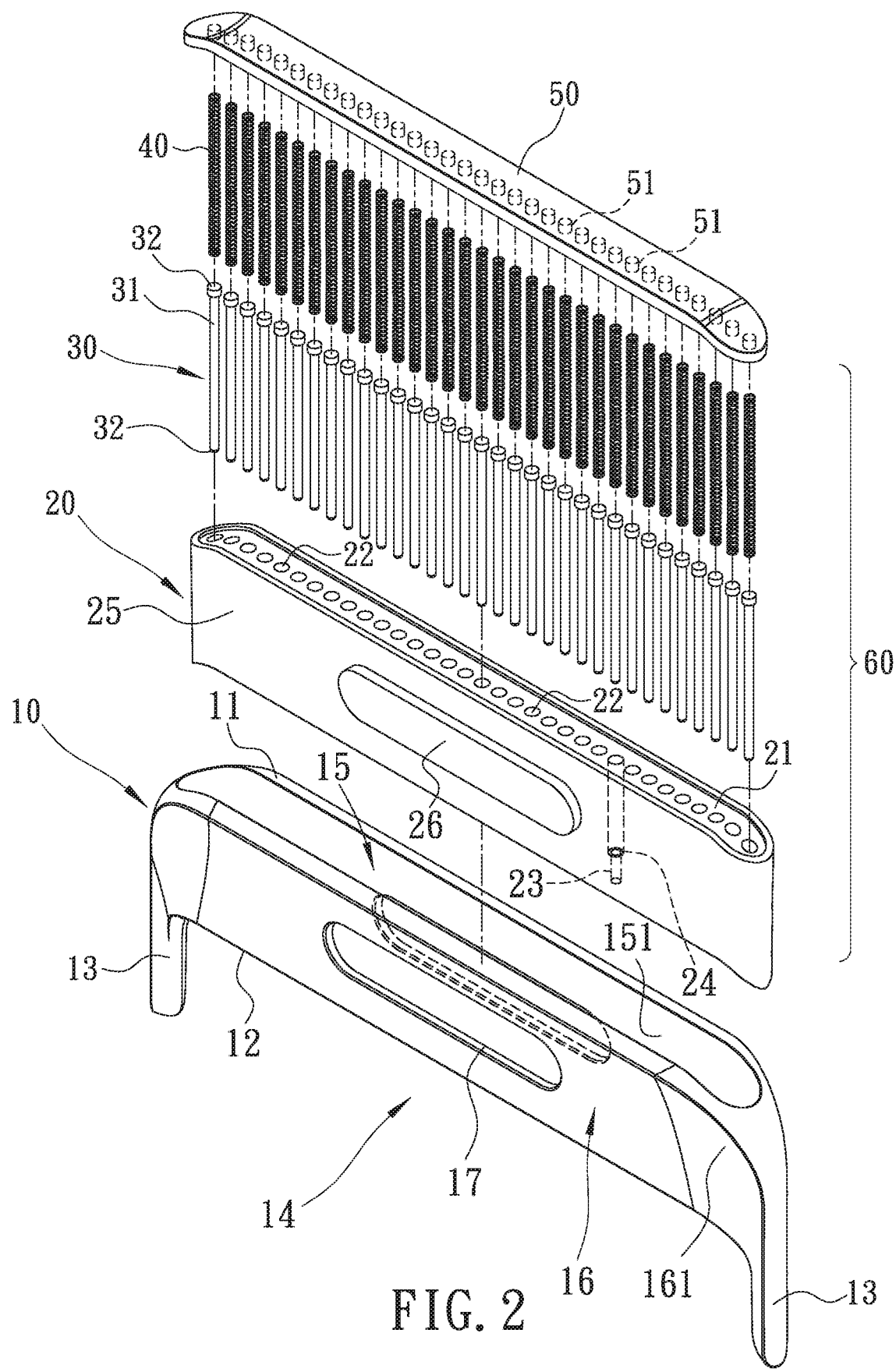
FIG. 2 is a perspective view showing the exploded components of the hair comb according to the first embodiment of the present invention.
Figure 3:
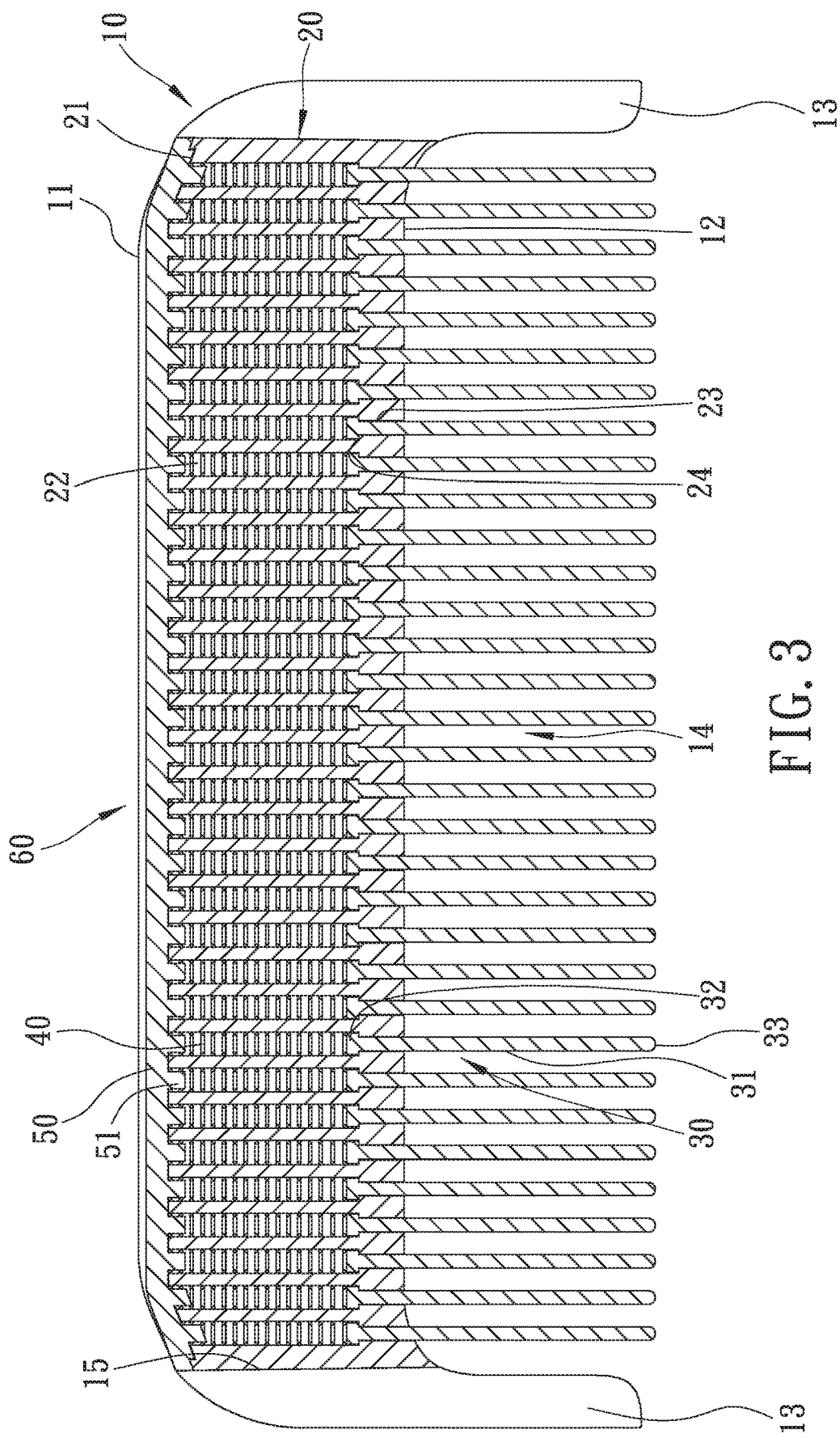
FIG. 3 is a cross sectional view showing the assembly of the hair comb according to the first embodiment of the present invention.
Figure 4:
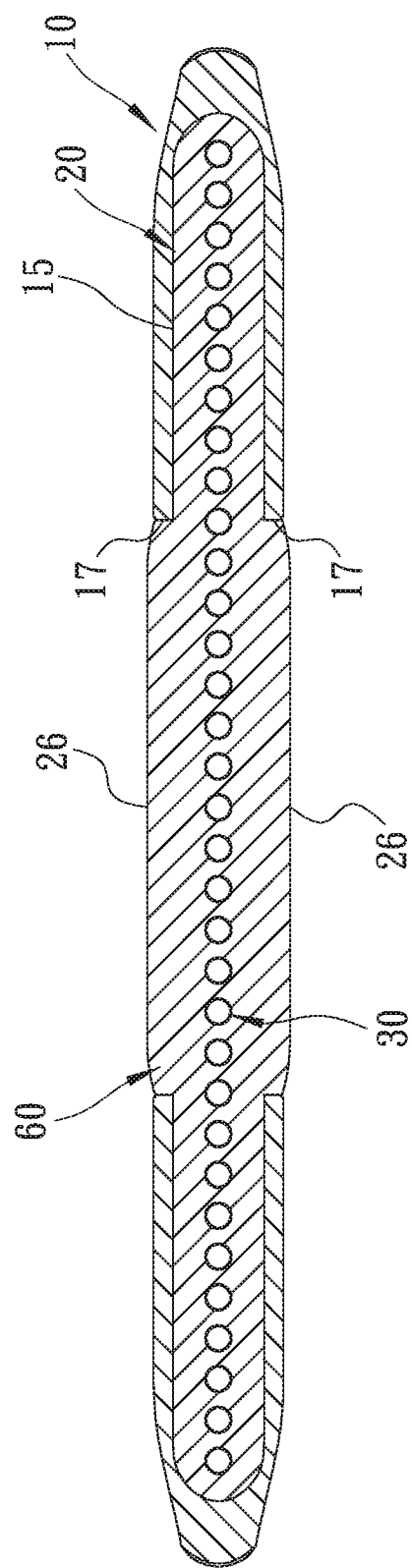
FIG. 4 is another cross sectional view showing the assembly of the hair comb according to the first embodiment of the present invention.
Figure 5:
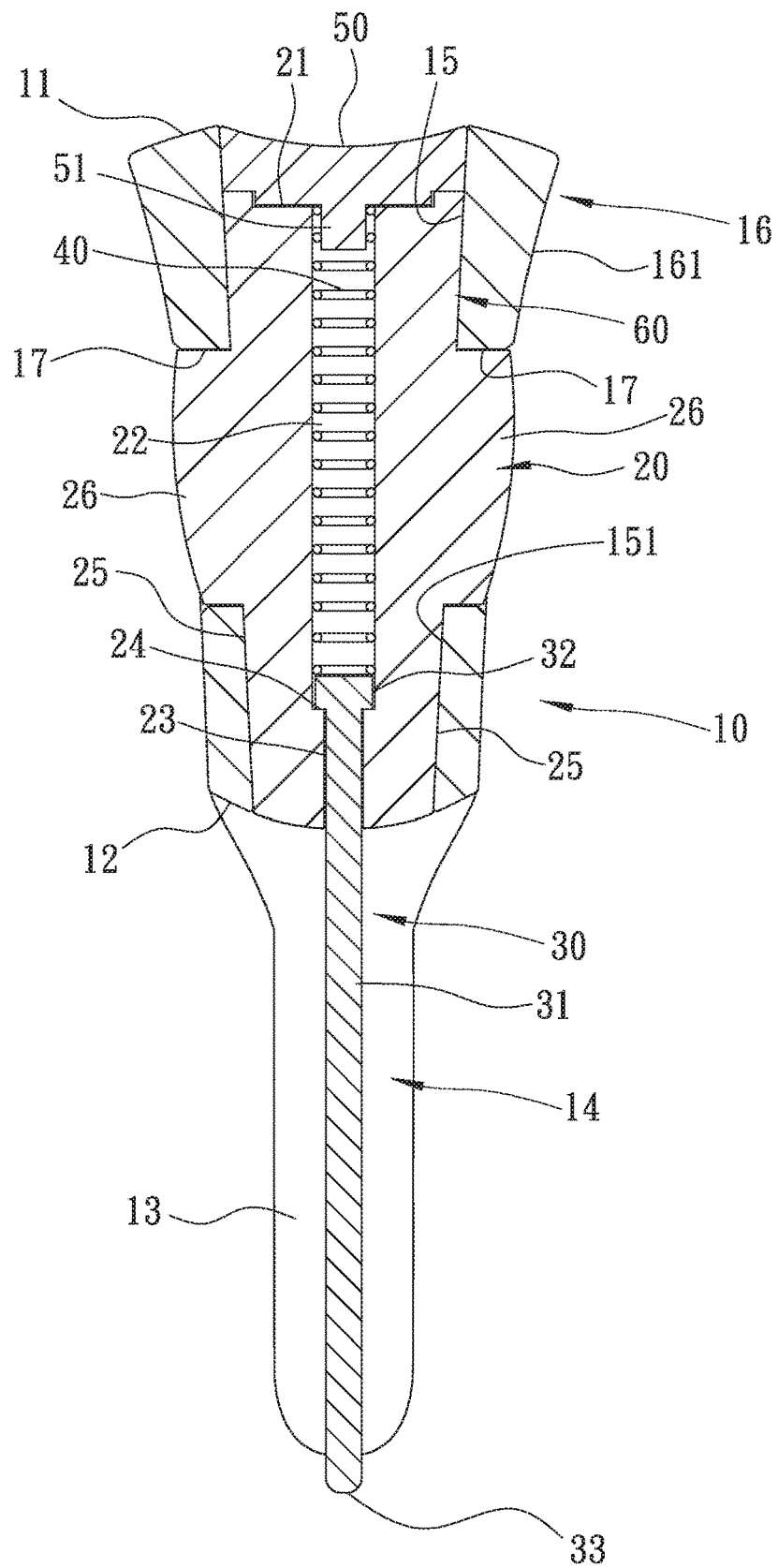
FIG. 5 is also another cross sectional view showing the operation of the hair comb according to the first embodiment of the present invention.

With reference to FIGS. 1-5, a hair comb according to a first embodiment of the present invention comprises: a hollow handle 10 and a combing assembly 60.

The hollow handle 10 is configured to accommodate the combing assembly 60, and the hollow handle 10 includes a top fringe 11 formed on a top thereof, a bottom fringe 12 formed on a bottom of the hollow handle 10, two protective extensions 13 respectively extending from two peripheral sides of the hollow handle 10, an accommodation chamber 14 defined between the two protective extensions 13, a locking groove 15 passing through the top fringe 11 and the bottom fringe 12, two holding faces 16 respectively defined on two peripheral surfaces of the hollow handle 10 among the top, the bottom and the two peripheral sides of the hollow handle 10, and a fixing orifice 17 passing through central portions of the two peripheral surfaces of the hollow handle 10, wherein a width of the locking groove 15 gradually reduces from the top fringe 11 to the bottom fringe 12, and the locking groove 15 has two tilted engagement faces 151 defined on two opposite walls thereof individually.

The combing assembly 60 includes a holder 20, multiple teeth 30, multiple springs 40, and a cap 50.

The holder 20 has a trench 21 defined on a top thereof and configured to accommodate the cap 50, and the cap 50 has multiple columns 51 extending from a bottom thereof. The holder 20 has two positioning faces 25 individually arranged on two outer surfaces thereof, a protrusion 26 formed on a middle section of the holder 20, multiple first apertures 22 defined on the trench 21, multiple second apertures 23 individually formed on bottoms of the multiple first apertures 22, wherein each of the multiple first apertures 22 is more than and is in communication with each of the multiple second apertures 23, and a shoulder 24 is defined between each first aperture 22 and each second aperture 23, wherein each first aperture 22 accommodates each of the multiple teeth 30 and the multiple springs 40.

Each of the multiple teeth 30 has an operation portion 31, a head 32 arranged on a top of each tooth 30 and a diameter of the head 32 being more than the operation portion 31, and a ball 33 formed on a distal end of the operation portion 31.

A thickness is defined between the two positioning faces 25 of the holder 20 and gradually reduces from the top of the holder 20 to the bottom of the holder 20 so that the two positioning faces 25 individually retain with the two tilted engagement faces 151.

Each first aperture 22 of the holder 20 accommodates each of the multiple teeth 30 and the multiple springs 40 and is covered by the cap 50. The holder 20 is slid into the hollow handle 10 so that the two positioning faces 25 individually retain with the two tilted engagement faces 151, and the fixing orifice 17 engages with the protrusion 26, such that the hollow handle 10 is connected with the combing assembly 60. Preferably, the two holding faces 16 have two oblique gripping sections 161 respectively defined thereon so that user matingly grips the hollow handle 10 and operates the hair comb with fingers.

When the distal end of the operation portion 31 is not pressed, a top of each spring 40 is fitted on each of the multiple columns 51 of the cap 50, and a bottom of each spring 40 abuts against the head 32 of each tooth 30 so that the head 32 is pushed by each spring 40 to contact with the shoulder 24, and each spring 40 pushes the operation portion 31 of each tooth 30 out of each second aperture 23.

Figure 6:
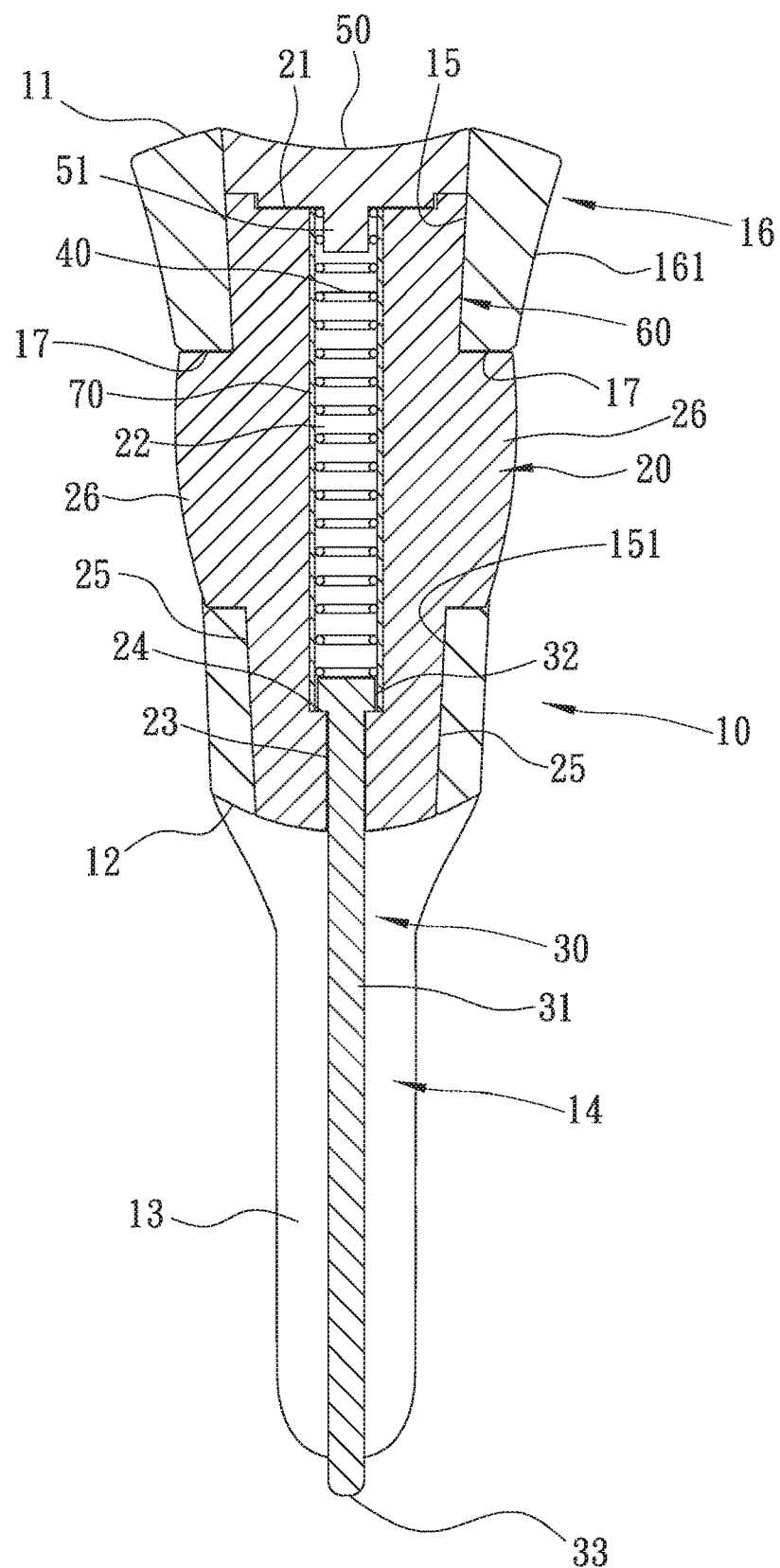
FIG. 6 is a cross sectional view showing the assembly of a hair comb according to a second embodiment of the present invention.

Referring to FIG. 6, in a second embodiment, each spring 40 is accommodated in each of multiple fitting tubes 70, a top of each fitting tube 70 is fitted on each column 51 of the cap 50, and a bottom of each fitting tube 70 abuts against the shoulder 24, wherein each fitting tube 70 accommodates each spring 40 and the head 32 of each tooth 30 so that when each spring 40 is actuated to retract inward or to expand outward, and each fitting tube 70 limits each springs 40 smoothly.

Figure 7:
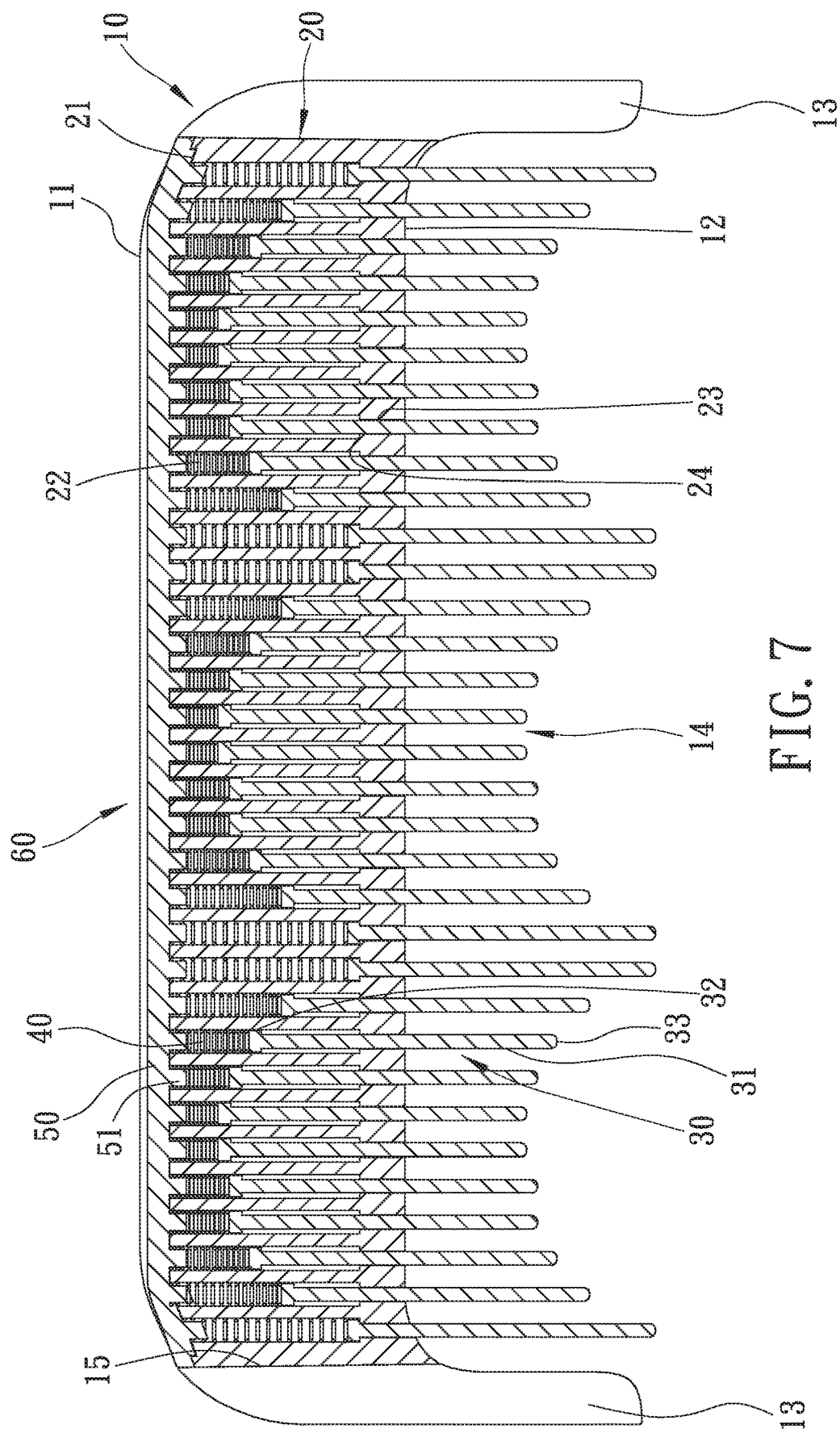
FIG. 7 is a cross sectional view showing the operation of the hair comb according to the second embodiment of the present invention.

As shown in FIG. 7, in use, the ball 33 of the operation portion 31 is pressed by user so that the operation portion 31 actuates each spring 40 to retract inward toward each first aperture 22, and each tooth 30 matingly contacts with the user.

Figure 8:
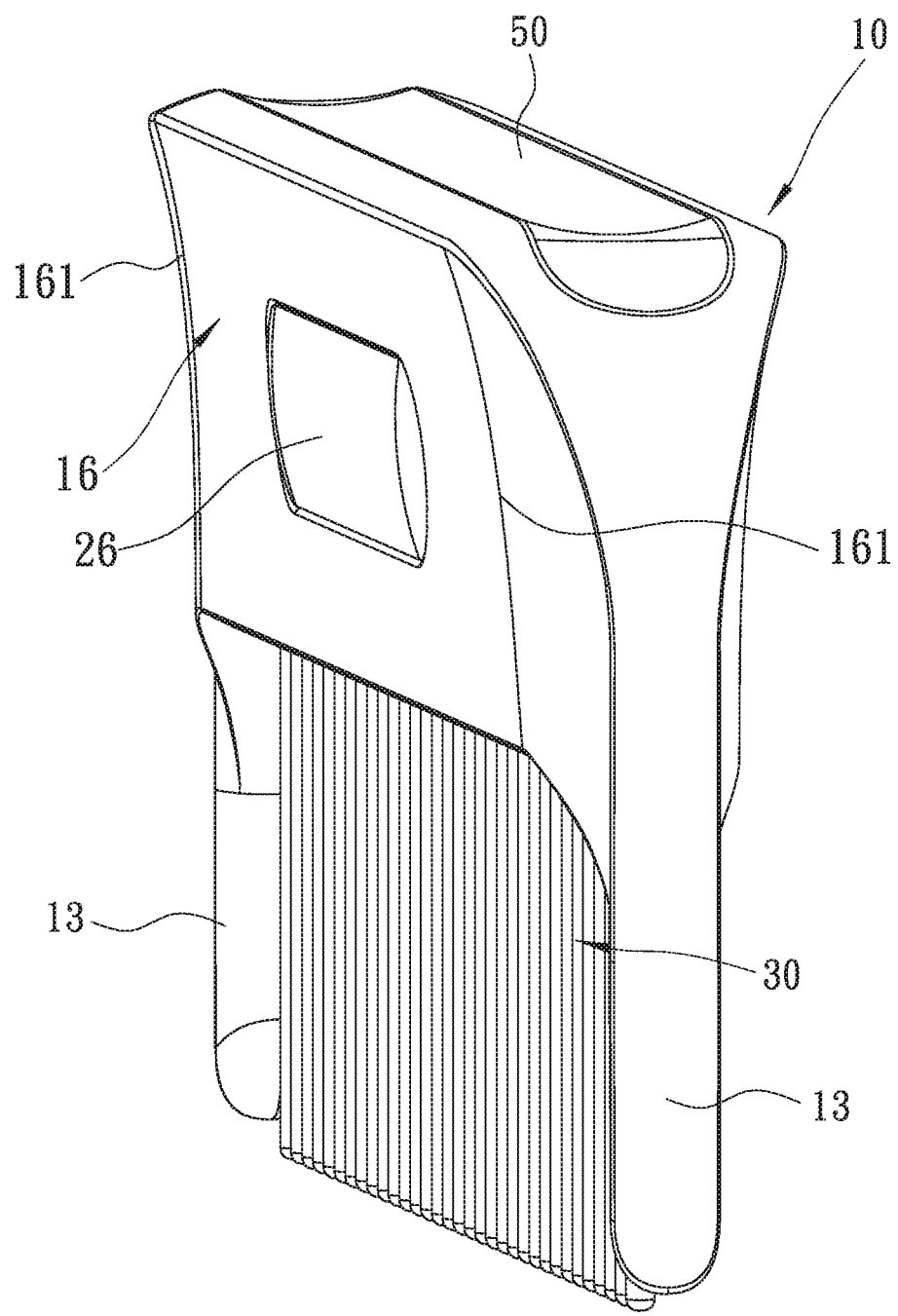
FIG. 8 is a perspective view showing the assembly of the hair comb according to the second embodiment of the present invention.

As illustrated in FIG. 8, the user matingly grips the hollow handle 10 and operates the hair comb with the fingers by way of the two oblique gripping sections 161 of the two holding faces 16.

While the first embodiments of the invention have been set forth for the purpose of disclosure, modifications of the disclosed embodiments of the invention as well as other embodiments thereof may occur to those skilled in the art. The scope of the claims should not be limited by the first embodiments set forth in the examples, but should be given the broadest interpretation consistent with the description as a whole.

What is claimed is:

1. A hair comb comprising:

a hollow handle configured to accommodate a combing assembly, and the hollow handle including a top fringe formed on a top of the hollow handle, a bottom fringe formed on a bottom of the hollow handle, two protective extensions respectively extending from two peripheral sides of the hollow handle, an accommodation chamber defined between the two protective extensions, a locking groove passing through the top fringe and the bottom fringe, and a fixing orifice passing through central portions of the two peripheral surfaces of the hollow handle, wherein a width of the locking groove gradually reduces from the top fringe to the bottom fringe, and the locking groove has two tilted engagement faces defined on two opposite walls thereof individually;

the combing assembly including a holder, multiple teeth, multiple springs, and a cap;

wherein the holder has a trench defined on a top thereof and accommodating the cap, and the cap has multiple columns extending from a bottom thereof, the holder has two positioning faces individually arranged on two outer surfaces thereof, a protrusion formed on a middle section of the holder, multiple first apertures defined on the trench, and multiple second apertures individually formed on bottoms of the multiple first apertures, wherein each of the multiple first apertures is more than and is in communication with each of the multiple second apertures, each first aperture accommodates each of the multiple teeth and the multiple springs, each of the multiple teeth has an operation portion, a head arranged on a top of each tooth and a diameter of the head being more than the operation portion, and a ball formed on a distal end of the operation portion.

2. The hair comb as claimed in claim 1, wherein the hollow handle further includes two holding faces respectively defined on two peripheral surfaces thereof among the top, the bottom and the two peripheral sides of the hollow handle.

3. The hair comb as claimed in claim 1, wherein the holder further has a shoulder defined between each first aperture and each second aperture.

4. The hair comb as claimed in claim 1, wherein a thickness is defined between the two positioning faces of the holder and gradually reduces from the top of the holder to the bottom of the holder so that the two positioning faces individually retain with the two tilted engagement faces.

5. The hair comb as claimed in claim 1, wherein two holding faces have two oblique gripping sections respectively defined thereon.

* * * * *